United States Patent [19]

Duncan

[11] 4,443,146
[45] Apr. 17, 1984

[54] BALE FEEDING APPARATUS

[76] Inventor: Andrew R. Duncan, 66 Kurapae Rd., Taupo, New Zealand

[21] Appl. No.: 454,882

[22] Filed: Dec. 30, 1982

Related U.S. Application Data

[63] Continuation of Ser. No. 174,660, Aug. 1, 1980, abandoned.

[51] Int. Cl.³ .............................................. A01D 90/10
[52] U.S. Cl. ..................................... 414/24.6; 414/911
[58] Field of Search ..................... 414/24.5, 24.6, 911;
198/813, 816; 241/101 A, 101.7

[56] References Cited

U.S. PATENT DOCUMENTS

| | | | |
|---|---|---|---|
| 2,294,441 | 9/1942 | Beers | 198/816 X |
| 2,438,068 | 3/1948 | Mercier | 198/813 |
| 4,078,733 | 3/1978 | Popiolek | 241/101.7 |

FOREIGN PATENT DOCUMENTS

| | | | |
|---|---|---|---|
| 2556234 | 6/1977 | Fed. Rep. of Germany | 414/24.6 |
| 2715577 | 10/1978 | Fed. Rep. of Germany | 414/24.6 |

Primary Examiner—Leslie J. Paperner
Attorney, Agent, or Firm—Holman & Stern

[57] ABSTRACT

A hay bale feeder (1) which can be carried or towed has a framework including spaced apart side walls (4;9,28) which define a trough (T) into which a round hay bale can be placed to be supported and rotated by an endless conveyor (14) extending across the trough (T) between the side walls (4;9,28). The endless conveyor (14) has bale engaging spikes (26) which engage with the bale causing it to rotate and at the upper edge of the side wall (9,28) tears off hay from the bale to give a narrow windrow feed out from the apparatus over the side wall (9,28).

8 Claims, 4 Drawing Figures

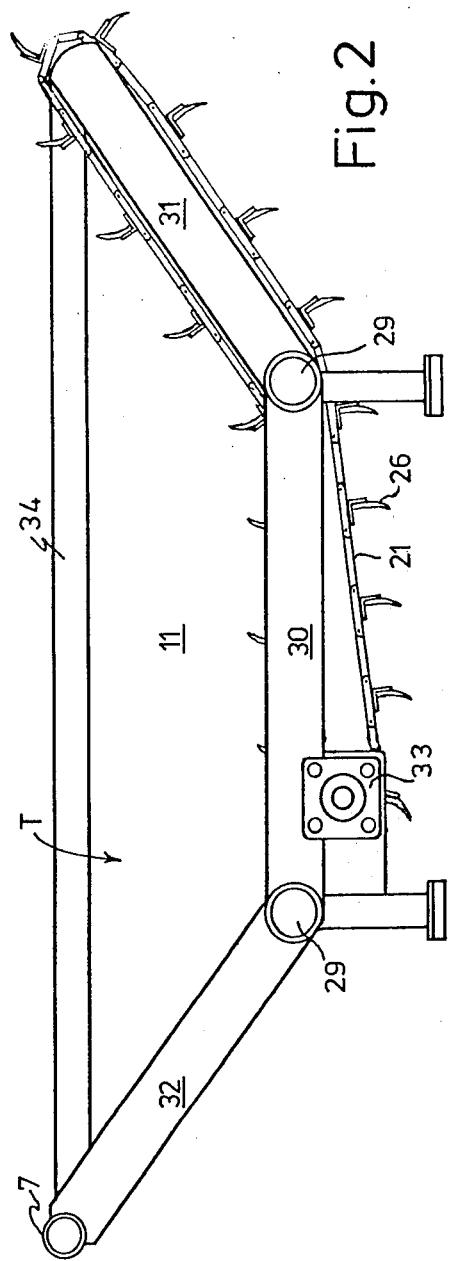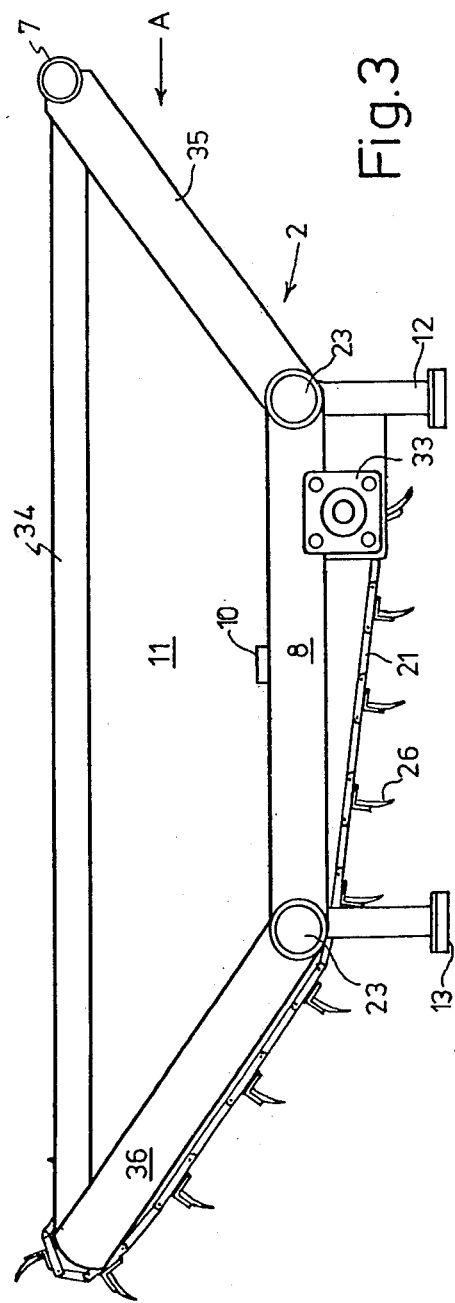

BALE FEEDING APPARATUS

This is a continuation of application Ser. No. 06/174,660, filed Aug. 01, 1980 which in turn is now abandoned.

BACKGROUND OF THE INVENTION

1. Field of the Invention

This invention relates to hay bale feeder apparatus and particularly such apparatus for feeding out hay from round bales.

2. Description of the Prior Art

To the present time it has been known to provide numerous types of hay bale feeders which enable the feeding out of round hay bales as they are towed or otherwise moved over the feed out area by means of a tractor or other agricultural vehicle.

Such previously known hay bale feeders have suffered from several disadvantages including their being complex and hence expensive not being suitable for particular types of terrain; not being suitable for particular types of feed; or not giving a uniform or desired feed-out.

In one particular form of previous design a major disadvantage has been that when a large round bale has been reduced in diameter to a certain amount the core that is left instead of continuing to give a uniform feed-out is able to escape through the feed exit which of course does not result in an efficient utilization of the entire round bale contents.

In another previous design described in U.S. Pat. No. 4,078,733 of Mar. 14, 1978 of Franz Michael Popiolek there is proposed the use of two generally planar conveyor beds which are placed end to end to form respectively the base and side wall of a trough. The first of these planar conveyor beds has a claw array which controls the rolling movement of the bale in order to achieve the pressing of the bale against the second planar conveyor. This second conveyor has tines which engage with the bale to discharge the bale material over its upper end. The bale as it sits on the first conveyor bed and is pressed against the second conveyor bed assumes a flattened shape and this design would be unable to handle an irregularly shaped bale. Furthermore, in attempting to achieve an effective handling and feeding-out of regularly shaped bales it is proposed that the respective inclinations of the conveyor beds are arranged with the second conveyor having a steeper incline than the first conveyor and with it also being driven at a higher speed.

BRIEF SUMMARY OF THE INVENTION

It is thus an object of the present invention to obviate at least some of the disadvantages of hay bale feeders to the present time.

The present invention thus provides in one embodiment a hay bale feeder comprising a front framework portion adapted for connection with a feeder transporting means, spaced apart first and second side framework portions defining a trough therebetween, said trough being adapted to accommodate a round bale of hay, an endless feed-out conveyor having hay removing means thereon and having an upper conveying run extending across said trough with an inclined portion of said upper conveying run extending over an upper end of said first side framework portion, said upper conveying run being suspended across said trough so as to engageably support and rotate the round bale while conforming to the shape thereof when the bale is positioned within said trough, movement of said hay removing means with said feed-out conveyor serving to feed out hay from said bale over said first side framework portion.

BRIEF DESCRIPTION OF THE DRAWINGS

The invention will now be described by way of example with reference to the accompanying drawings, wherein;

FIG. 2 is a elevational rear view of the hay bale feeder of FIG. 1, FIG. 3 is a front elevational view of the hay bale feeder on FIG. 1.

DETAILED DESCRIPTION

Figure 1:
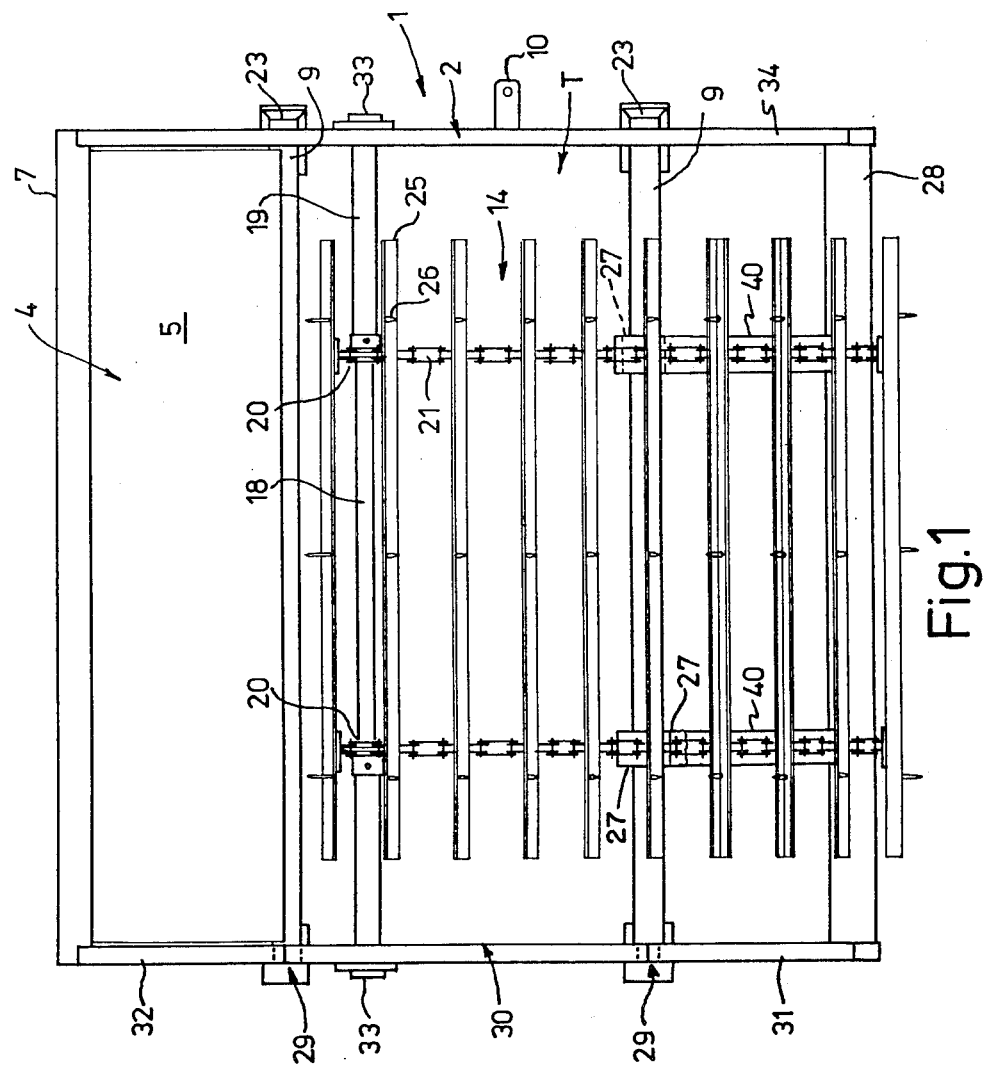
FIG. 1 is a top plan view of a hay bale feeder according to one embodiment of the invention from one side.

The present invention broadly provides a hay bale feeding apparatus, suitable for feeding out all types and sizes of round bales, both hard and soft centered hay, lucerne, straw, baled corn and the like, inculding a framework formed with a trough defined between spaced apart side walls. The trough so formed is adapted to accommmodate a large round bale of hay which may be of, for example, five foot or six, foot in diameter and weigh up to 1000 kg.

The feeder of the present invention enables a narrow windrow feed out to one side of the apparatus to ensure minimal wastage.

The framework also includes a base and a drive means such as a motor, suitably hydraulic, tractor P.T.O connection or connection to ground wheels, for driving an endless hay feed-out mechanism which, suspended within the trough, lies along the base and extends upwardly towards, and over, one of the side walls.

The hay bale is thus positionable within the trough and supported by the feed-out drive mechanism which may suitably be an endless conveyor having bale engaging and tearing means such that as the conveyor is moved the round bale is rotated and, towards the upper end of the side wall, hay is torn off and fed from the apparatus over the side wall.

It will be appreciated that as the bale is supported on the feed-out mechanism the feed-out mechanism can accommodate irregular shaped bales which quite often occur due to the storage of a round bale which can tend to ovality and can be difficult to handle in presently known bale feeding apparatus.

The endless conveyor may comprise a plurality of roller chains engaged with and driven by respective sprockets at one end of their travel and passing over a tubular member forming an upper edge of the side wall at the opposite end of their travel; the roller chains may suitably be interconnected by transverse bars which can be provided with upwardly and forwardly directed spikes which engage with the hay bale to rotate it and tear off hay therefrom.

One end of the framework may be open to facilitate the entry of the round bale therein whilst the other end of the framework may be closed off for example by means of a suitable bar and/or one or more panels extending between the side walls.

The apparatus and more particularly its framework is adapted so as to be transportable by an agricultural vehicle such as a tractor or the like and for this purpose may be provided with one or more spear holes in its base which may be provided by the open ends of suitable diameter pipe secured to or forming part of the framework. The spear holes may then be engaged by the respective spears mounted on the agricultural vehicle such that the apparatus can be lifted by the lifting mechanism of the agricultral vehicle which is usually hydraulically operated.

It will be appreciated that the one or more spears of the agricultral vehicle can also be used in securing the bale and lifting same onto the framework from one end with the vehicle's spears then engaging the apertures at one end of the framework to lift same for the bale feeding operation to commence.

The framework may additionally be provided with legs and/or skid pads to support the framework on the ground.

Hydraulic couplings to a hydraulic motor mounted on the framework will suitably provide power from the agricultural vehicle to the drive for the feed-out mechanism although in alternative embodiments the feed-out mechanism may be driven by a drive from ground wheels provided for the framework or by connection with the P.T.O. of the agricultural vehicle.

Referring now to the accompanying drawings, a hay bale feeder apparatus according to one embodiment of the invention is referenced generally by arrow 1.

The feeder 1 has a framework including a front framework portion referenced generally by arrow 2 which is adapted for connection with the vehicle which will tow the feeder 1. To this end the front framework portion 2 is shown having a forwardly directed locking plate 10 which can be engaged by means of a pin, shackle or the like with the implement or attachment which will connect the apparatus 1 with the towing or carrying vehicle.

The front portion 2, see FIG. 3 particularly, is also seen to have a base cross member 8 extending between two upwardly and outwardly inclined side members 35 and 36 on either side thereof together with a front panel 11 and an upper transverse member 43.

Also provided in the front framework portion 2 are shown a pair of apertures 23 comprising respective ends of two side framework members 9, the apertures 23 being engageable by forks or spears of the implement or connection linking the feeder 1 with the towing or carrying vehicle.

Depending downwardly from the front framework portion 2 are shown a pair of legs 12 with feet or skid pads 13 at their base which together with corresponding legs 12 at the rear of the apparatus 1 will enable the apparatus 1 to be supported on the ground when not being towed or carried.

The rear framework portion of this embodiment of the invention, see FIG. 2 particularly, is seen to be open to facilitate the positioning of a hay bale (not shown) within the framework 1. The rear framework portion is thus seen to have a transverse base member 30 extending between two upwardly and outwardly inclined side framework members 31 and 32, with the other open end of the side framework members 9 providing respective apertures 29 which can accommodate the forks or spears of a desired implement or attachment, for example a caster wheel assembly or a wheeled bale carrying trailer.

The side framework portions of the feeder 1 extending between the front and rear framework portion are seen from FIG. 2 especially to define a trough T therebetween in which a round hay bale can be rotatably accommodated.

Figure 4:
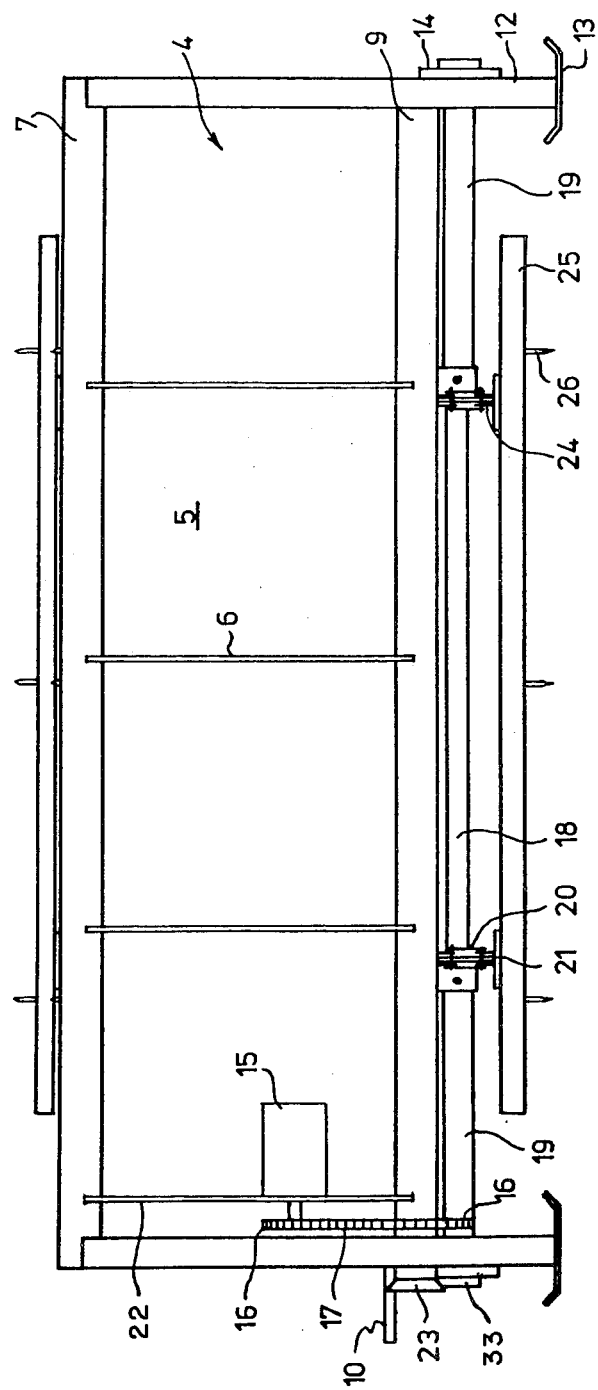
FIG. 4 is an elevational view taken from arrow A of FIG. 3.

The left hand side framework portion as seen from the rear in FIG. 2, is referenced generally by arrow 4 and is shown in FIGS. 1 and 4 as having one or more panels 5 extending between the side framework members 32 and 35 at the rear and front respectively and has an upper longitudinal framework member 7 and a lower longitudinal framework work member 9, stiffeners 6 extending between the longitudinal members 7 and 9 behind the panels 5.

Towards the front of the side framework portion 4 is shown provided a motor mounting plate 22 on which a hydraulic motor 15 may be mounted and connected by means of sprockets 16 and drive chain 17 with a drive shaft 18 of a hay bale feed out mechanism hereinafter described.

Anti-wrap tubes 19, suitably made of a plastic such as P.V.C. are shown covering over the shaft or axle 18 between its respective ends and a pair of drive sprockets 20 provided thereon.

The number of sprockets 20 will of course correspond with the number of chains 21 of the feed-out mechanism, a pair of chains 21 being shown in this embodiment by way of example. Each chain 21, suitably a roller chain, is connected with spaced apart transverse bars 25 by means of K1 attachments 24, the bars 25 with their attachments 24 suitably being provided on each second outer link of each chain 21.

The transverse bars 25 may suitably be of angle iron and are shown provided with upwardly and forwardly directed spikes 26. The shaft or axle 18 is shown extending along the apparatus 1 adjacent and beneath the side framework portion 4 to be mounted in respective bearings at each end in bearing housings 33 provided in the front and rear framework portions.

From FIGS. 1 and 4 it will be seen that the apertures 23 in respective longitudinal framework members 9 may be flared or bell-mouthed.

The feed-out mechanism referenced generally by arrow 14 is shown extending from the drive sprockets 20 on the shaft 18 towards the other side framework portion defined between a lower one of said longitudinal framework members 9 and an upper longitudinal side framework member 28.

If the chains 21 are roller chains then the tubular member 28 will allow the chains 21 to roll thereover although it is envisaged that if for example other types of chains or suspended feed-out mechanism were used then appropriate roller or sprocket means may be provided at the upper end of the travel of the feed-out mechanism 14.

This type of feed-out mechanism 14 is of course given by way of example only and could alternatively be any other type of suspended movable bed which will support a round bale and which will enable the hay to be torn therefrom. Thus, the chains 21 could be replaced by one or more belts for example and the chains or belts may be completely covered over by the conveyor instead of having the space defined between adjacent transverse bars 25 as in the example in the embodiment shown.

Along a bottom part of the travel of the chains 21 are shown provided respective chain tensioners 27 which may suitably comprise arcuate plates pivotally connected with the longitudinal framework member 9 and able to be adjusted in their abutting relationship with a respective chain 21 to increase or decrease the tension thereon. To this end a bolt may extend through a plate secured to the framework member 9 and be engageable behind the arcuate plates of the tensioning means 27, the chain in its travel running across the front face of the arcuate plate.

In operation, a round bale can be loaded into the trough defined by the side framework portions or walls of the feeder 1 through the open rear framework portion defined by members 30, 31 and 32 and upon operation of the feed-out mechanism such as 14 by means of operation of the hydraulic motor 15 from the hydraulic controls of the towing vehicle or by operation of the drive from ground wheels connected to the apparatus 1 or drive from a p.t.o. for example, rotation of the feed-out mechanism will rotate the bale and at the upper end of its travel the endless conveyor forming the feed-out mechanism and extending across the trough will tear off hay from the round bale and release it in a narrow windrow alongside the feeder 1, in the embodiment shown to lay beneath the upper longitudinal side framework member 28.

The chains 21 and the transverse bars 25 of the feed-out mechanism 14 are suspended between its drive sprockets 20 and the upper framework member 28 and can thus support and adjust to the contour of the hay bale, this being of advantage in that round bales do have a tendency to lose their shape and become oval.

In the event of the overloading of the drive mechanism 14 shown particularly in FIG. 1 of the accompanying drawings, curved chain skid bars 40 may be incorporated as shown between the side framework members 9 and 28 beneath the respective chains 21 along their upper travel such that the chains 21 will then run only on a respective skid bar 40 if overloading occurs. To enable the chain tensioning means 27 beneath the framework member 9 to be seen, in FIG. 1 one of these skid bars 40 has been partially omitted. Each of the skid bars 40 may suitably comprise a steel bar taking the form of a lazy-S shape with its ends secured about respective tubular members 28 and 9.

It is mentioned that although the drive for the feed-out mechanism 14 is shown in the accompanying drawings as provided at the bottom of the trough with the provision of the drive shaft 18 the drive could alternatively be provided in conjunction with the upper side framework member 28. It is also mentioned in this regard that whilst the use of a hydraulic motor has been previously described this could of course be readily replaced by an electrical drive if desired.

The feeder 1 could be used if desired on a truck tray or on the rear of the tray with special adaptations for the mounting thereof.

In the embodiments shown in the accompanying drawings the provision of open tube ends 23 and 29 at each end of the feeder 1 enables the feeder 1 to be lifted and transported from either end.

If desired a closure such as a panel, bar or the like may be provided for the rear framework portion 30, 31, 32 so as to contain the bale within the trough T.

Whilst the provision of spikes 26 which may as previously described be also forwardly directed, would be necessary for certain types of feed being fed out from the feeder 1, such spikes 26 are optional and may be omitted.

Additionally, and as previously mentioned herein the feed-out mechanism may be of any suitable suspended type and may substantially close off the side framework portion over which the material is fed out from the feeder 1.

Where in the aforegoing description reference has been made to specific components or integers of the invention which have known equivalents then such equivalents are herein incorporated as if individually set forth.

Although this invention has been described by way of example and with reference to one possible embodiment thereof it is to be understood that modifications and improvements may be made thereto without departing from the scope of the invention as defined in the appended claims.

I claim:

1. A hay bale feeder comprising a front framework portion adapted for connection with a feeder transporting means, spaced apart first and second side framework portions each having upper and lower ends defining a trough therebetween, said trough being adapted to receive a round bale of hay, a single endless feed-out conveyor having hay removing means thereon and having an upper conveying run extending across said trough in a direction substantially transverse to said side framework portions with an inclined portion of said upper conveying run extending over the upper end of said first side framework portion, said upper conveying run being suspended across said trough so as to engageably support and rotate the round bale while conforming to the shape thereof when the bale is positioned within said trough and so that operation of said hay removing means with said feed-out conveyor feeds out hay from said bale over said first side framework portion.

2. A hay bale feeder as claimed in claim 1 wherein said first and second side framework portions comprise first and second upwardly and outwardly inclined side walls, said feed-out conveyor at the upper end of its travel passing over the upper end of said first side wall, and means to drive said conveyor.

3. A hay bale feeder as claimed in claim 1 wherein said framework includes a base having a pair of spaced apart tubular members open at one or both of their respective ends with the said open ends providing respective front and rear connecting means for said framework and at said front portion of said framework providing said connection for said feeder transporting means.

4. A hay bale feeder as claimed in claim 3 wherein a rear portion of said framework is open and leads directly into said trough so as to facilitate the positioning of one of said bales within said trough.

5. A hay bale feeder as claimed in claim 1 wherein said feed-out conveyor comprises a plurality of chains and said hay removing means comprises a plurality of spaced apart transverse bars connected to said chains with bale engaging and tearing spikes upwardly projecting therefrom.

6. A hay bale feeder as claimed in claim 5 wherein said feed-out conveyor comprises a plurality of said chains having a bale supporting bed connected thereto and movable therewith.

7. A hay bale feeder as claimed in claim 5 wherein each of said chains is engaged by a chain tensioning means movable relative to said framework.

8. A hay bale feeder as claimed in claim 7 wherein said chain tensioning means comprises an arcuate plate member pivoted to said framework and pivotable into adjustable abutting engagement with a respective chain.

* * * * *